United States Patent [19]

Waldherr

[11] Patent Number: 5,245,761
[45] Date of Patent: Sep. 21, 1993

[54] LOCKING MECHANISM FOR RETRACTABLE TAPE

[76] Inventor: Arthur Waldherr, 201 Freeport Dr., Bloomingdale, Ill. 60108

[21] Appl. No.: 840,830

[22] Filed: Feb. 25, 1992

[51] Int. Cl.$^5$ .............................................. G01B 3/10
[52] U.S. Cl. ...................................... 33/767; 242/848; 242/107.3
[58] Field of Search .............. 33/767; 242/84.8, 86.63, 242/86.64, 86.7, 99, 107.12, 107.15, 107.2, 107.3, 107.4 R, 107.6

[56] References Cited

U.S. PATENT DOCUMENTS

| | | |
|---|---|---|
| 569,792 | 10/1886 | Lyon . |
| 655,052 | 7/1900 | Brunello ........................ 242/84.8 |
| 1,232,299 | 11/1917 | Hance . |
| 1,514,901 | 11/1924 | Gilman ........................... 242/84.8 |
| 1,956,806 | 5/1934 | Mitzen ........................... 242/84.8 |
| 2,031,434 | 2/1936 | Stern et al. ................... 242/107.12 |
| 2,071,225 | 4/1936 | Buttigieg . |
| 2,080,815 | 5/1937 | Gasstrom . |
| 2,151,130 | 3/1939 | Mattsson et al. ............... 33/767 |
| 3,482,798 | 12/1969 | Kawaguchi ..................... 242/99 |
| 4,123,753 | 10/1978 | Gravert . |
| 4,531,688 | 7/1985 | Gail . |
| 4,663,854 | 5/1987 | Miller et al. .................... 33/767 |
| 4,856,726 | 8/1989 | Kang .............................. 33/767 |
| 5,007,178 | 4/1991 | Dewire et al. ................... 33/767 |

FOREIGN PATENT DOCUMENTS

| | | | |
|---|---|---|---|
| 1331531 | 5/1963 | France ........................ | 33/767 |
| 942381 | 11/1963 | United Kingdom ........... | 242/84.8 |

*Primary Examiner*—Thomas B. Will
*Attorney, Agent, or Firm*—Emrich & Dithmar

[57] ABSTRACT

A retractable tape measure having a housing with an opening therein through which a portion of the tape extends with the remainder of the tape being coiled around a spring biased reel having a hub around which the tape is coiled. Opposed annular ends on the hub retain the tape coiled therearound. Each of the annular ends have a serrated circular peripheral edge with about 90 to about 150 serrations. Locking mechanism is shiftably mounted on the housing movable into and out of engagement with the serrated edges. The locking mechanism has a plurality of serrations thereon which when engaged with a plurality of serrations on each annular end provide a positive lock for the tape coiled around the reel hub to prevent further withdrawal of the tape.

20 Claims, 3 Drawing Sheets

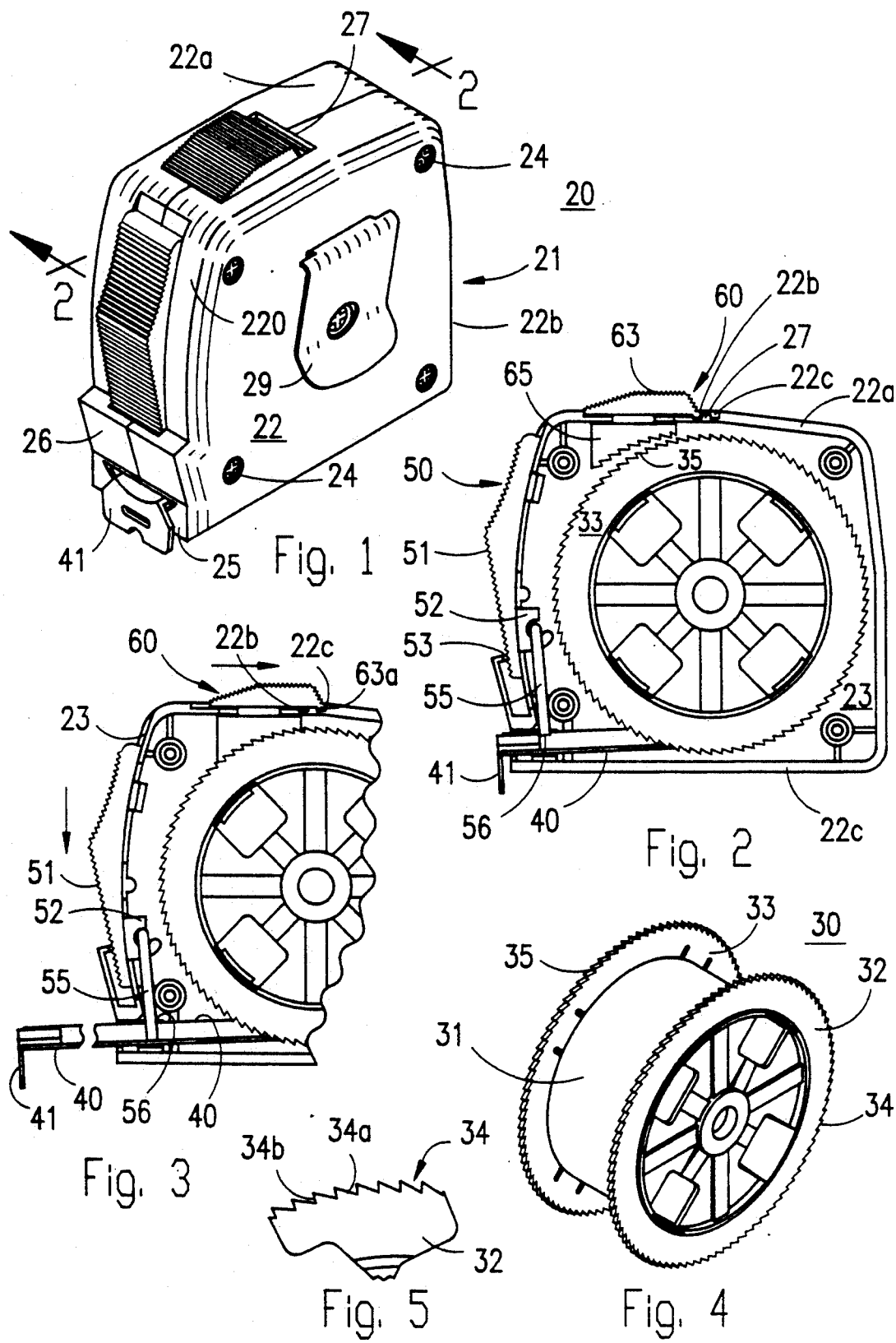

LOCKING MECHANISM FOR RETRACTABLE TAPE

BACKGROUND OF THE INVENTION

The present invention relates to a positive stopping device for a tape measure. In conventional tape measures, a frictional engagement or pressing means has been provided at a side of the tape measure body and stopping of the tape measure has been carried out by pressing the stopping means into frictional engagement with the marked face of the measure or tape. After repeated uses, there is a possibility that the measuring indicia can be wiped from the face of the tape and even if this does not occur, the stopping means is not positive in the sense that there is only a frictional engagement which makes movement of the tape measure somewhat more difficult but does not provide any kind of actual positive locking mechanism for the tape measure.

There are a variety of patents which have issued some recently and some not so recently which show mechanism for positively stopping a tape measure but all of these devices fail to provide the type of control necessary for carpentry uses or require expensive mechanisms to modify standard tape measures. For instance, the Kang U.S. Pat. No. 4,856,726 issued Aug. 15, 1989 shows a stopping device for a tape measure wound on a spool or reel but the device is adaptable only to a large tape measure device and requires an expensive interrupt mechanism to be added onto the casing of the tape measure, the entire combination being much too clumsy and much too large to be incorporated into the standard tape measure of the type commonly sold at hardware stores for carrying on a carpenter's belt or useful around the house. Moreover, the tape measure cannot be stopped at small intervals.

U.S. Pat. No. 4,531,688 issued to Gail Jul. 30, 1985, also shows a positive stopping mechanism for a measuring tape. In the Gail device, an entirely new spool has to be designed in order to accommodate what is essentially a clutch device wherein the clutch has to move axially with respect to the drum. This device while perhaps satisfactory, involves the kind of moving parts which can cause difficulty when a tape measure is subjected to kinds of abuse encountered in the field when used by construction carpenters also requires a relatively complex mechanism in comparison to the invention hereinafter disclosed. In addition, the tape measure cannot be stopped at small intervals.

Other patents of general interest include the Buttigieg U.S. Pat. No. 2,071,225 issued Feb. 16, 1937 and the Gasstrom U.S. Pat. No. 2,080,815 issued May 18, 1937, both for measuring tape devices. Neither of these patents show the kind of stopping mechanism which is the subject of the invention, that is a positive locking mechanism which is capable of locking the measuring tape at 1/16 to ⅛ inch intervals and which requires no actual moving parts but relies instead on a simple straight forward device which nevertheless provides the positive interlock needed by carpenters and the like.

OBJECTS OF THE INVENTION

Accordingly, it is an object of the invention to provide a positive locking mechanism for a measuring tape which fixes the tape with respect to the housing in increments of about 1/16 inch.

Another object of the invention is to provide a positive locking mechanism for a measuring tape where the stop mechanism engages and disengages without having to slide with respect to each other.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a tape measure incorporating the subject invention wherein the tape is coiled within the housing.

FIG. 2 is a sectional view of the tape measure illustrated in FIG. 1 as seen as along line 2—2 thereof with both the frictional locking mechanism and the positive locking mechanism in the unlocked position;

FIG. 3 is a view like a portion of FIG. 2 with the frictional engaging mechanism in a locked position and the positive locking mechanism of the subject invention in a locked position;

FIG. 4 is a perspective view of the spool or reel of the subject invention showing the serrations or teeth on the spool or reel rims;

FIG. 5 is an enlarged view of the teeth or serrations on the spool rims illustrated on FIG. 4;

DETAILED DESCRIPTION OF THE INVENTION

Figure 6:
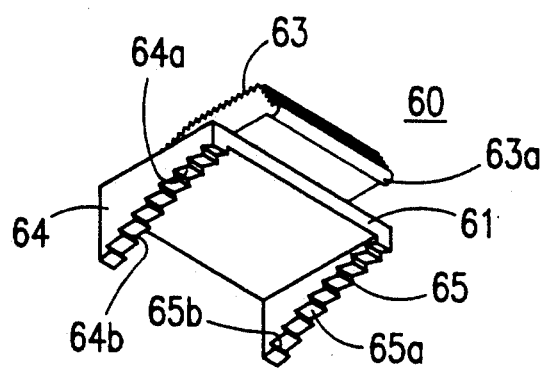
FIG. 6 is a perspective view of the locking mechanism of the present invention, particularly that illustrated in FIGS. 1 through 5.

Referring now to FIGS. 1-6 of the drawings, there is disclosed a tape measure 20 of the conventional type including a housing 21 having opposed side panels 22 meeting at a parting line along the top 22a, the back 22b, bottom 22c and front 22d. The housing 21 is held together by a plurality of screws 24 in the usual manner and has an opening 25 in the front panel 26 of the housing through which the tape 40 protrudes, the tape having a tab 41 which prevents the tape 40 from being drawn completely into the housing by a torsion spring, now shown. The housing 21 further includes a top opening 27 and an opening 23 in the front, both the top opening 27 and the front opening 23 being for actuators as hereinafter to be explained. Rearward of the top opening 27 are transversely extending longitudinally spaced notches 22b and 22c in the top 22a, see FIGS. 2 and 3, for a purpose hereinafter set forth. A ordinary clip 29 is affixed to one of the side panels 22 to facilitate clipping the tape measure 20 onto a carpenter's belt or the like.

A reel or spool 30 is contained inside the housing 20, rotatably mounted on stub shafts (not shown) on each of the side panels 22 of the housing 21, the spool or reel 30 having a hub 31 and opposed circular ends 32 and 33. Each of the circular ends 32 and 33 has an annular portion which has a circular peripheral edge, respectively, provided with a plurality of serrations or teeth 34, 35 therealong. Each of the serrations or teeth 34 and 35 is shown in FIG. 5 and includes an inclined surface 34a or 35a and a vertical surface 34b or 35b. The inclined surfaces 34a and 35a are angularly disposed in the range of from about 45° to about 90°, with about 70° being preferred.

A first locking mechanism 50 includes an actuating member 51 having a ribbed outer surface and having an inwardly extending tab 52 which extends through an opening 53 in front panel 26 and is connected to a vertically extending and movable engagement member 55 having a convex curved end portion 56 which is adapted fractionally to engage the flexible measuring tape 40 when the actuator 51 is moved vertically as illustrated in FIG. 3. It should be understood that the first locking mechanism 50 is movable between a retracted position illustrated in FIG. 2 and the extended or locking position illustrated in FIG. 3.

A second locking mechanism 6 is illustrated in FIGS. 2, 3 and 6 and comprises a base plate 61 connected to a ribbed actuator member 63, the forward transverse edge of the ribbed actuator 63 has a depending bead 63a which fits into the notches 22b and 22c, for a purpose hereafter set forth. The base plate 61 has spaced apart end members 64 and 65, each being provided with serrations on the edges thereof which are substantially the same in dimension the serrations 34 and 35 of the spool or reel 30. Each of the serrations 64 and 65 have vertically extending portions 64b and 65b and inclined portions 64a and 65a, the serrations 64, 65 are intended to mesh with and engage the serrations 34 and 35 on the spool or reel 30. FIG. 2 illustrates the second locking mechanism 60 in its unengaged position and FIG. 3 shows the locking mechanism 60 in its engaged position wherein the serrations 64, 65 respectively engage serrations 34, 35, thereby preventing further rotation of the spool or reel 30 so as to preclude further withdrawal of the tape measure 40 from the housing 21.

Because the bead 63a fits into the notch 22c when locking member 60 is in its locked position and because of the vertical extent of the end members, 64, 65, the locking member 60 is trapped, in its locked position, between the bottom of top 22a and the spool 30 and particularly the ends thereof 32, 33. Because of these conditions, clockwise force on the spool 30 due to pulling on the tape 40 cannot dislodge the locking member 60 from its engaged or locked position with spool 30.

Further, because there are between about 90 and 150 serrations or teeth 34, 35 around the periphery of the circular ends 32, 33, respectively, of the reel or spool 30, the tape 40 can be withdrawn and then fixed in increments of about 1/16 of an inch. This is an advantage over the prior art and an advantage not suggested by the prior art. In addition, the provision of teeth or serrations 64, 65 on the second locking member 60, both of which mate and engage the teeth 34, 35 on the spool 30 provides a secure locking mechanism preventing any movement of the tape 40 outwardly from the housing 21 when the second locking mechanism is engaged.

Figures 7, 8:
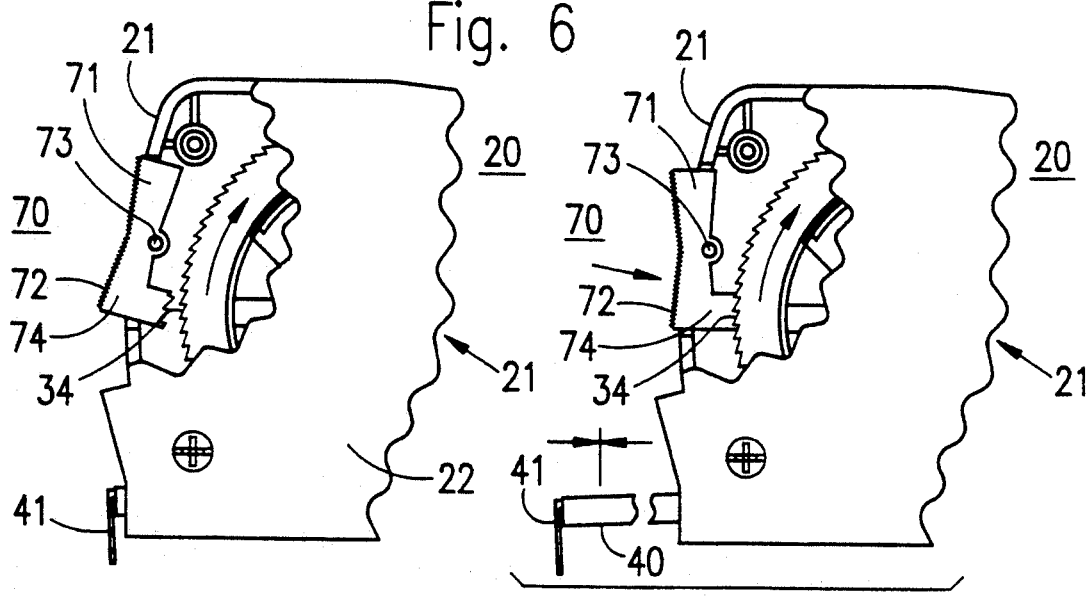
FIGS. 7 and 8 are side elevational views partly in section of another embodiment of the subject invention.

Referring to FIGS. 7 and 8, there is disclosed another embodiment of the invention in which a locking mechanism 70 is disclosed wherein a face plate 71 having serrations 72 on the outer surface thereof is pivotally mounted as at 73 to the housing 21, the base plate 71 having a pair of spaced apart serrations 74 (one not shown) corresponding to the serrations or teeth 64 and 65 of the previously explained locking mechanism 60. The operation of the mechanism 70 is the same as the operation of the mechanism 60 with the exception that the serrations 74 pivot into and out of engagement with the serrations on the reel or spool 30 whereas the mechanism 60 slides into engagement with the reel or spool serrations 34, 35. The arrow in FIG. 8 shows how the pivoting movement around the pivot pin 73 results in engagement of the serrations 74 (one not shown) with the serrations 34, 35, respectively, on the reel or spool 30.

It is important that the teeth 64, 65 of the second locking mechanism 60 are on arc having the same radius as the teeth 34, 35 on spool 30. Moreover, to ensure that a secure lock occurs it is important that more than one tooth 64, 65 engages with the teeth 34, 35. Preferably, at least three teeth 64, 65 are in engagement with the teeth 34, 35 when the second locking mechanism 60 is engaged.

Figures 9, 10:
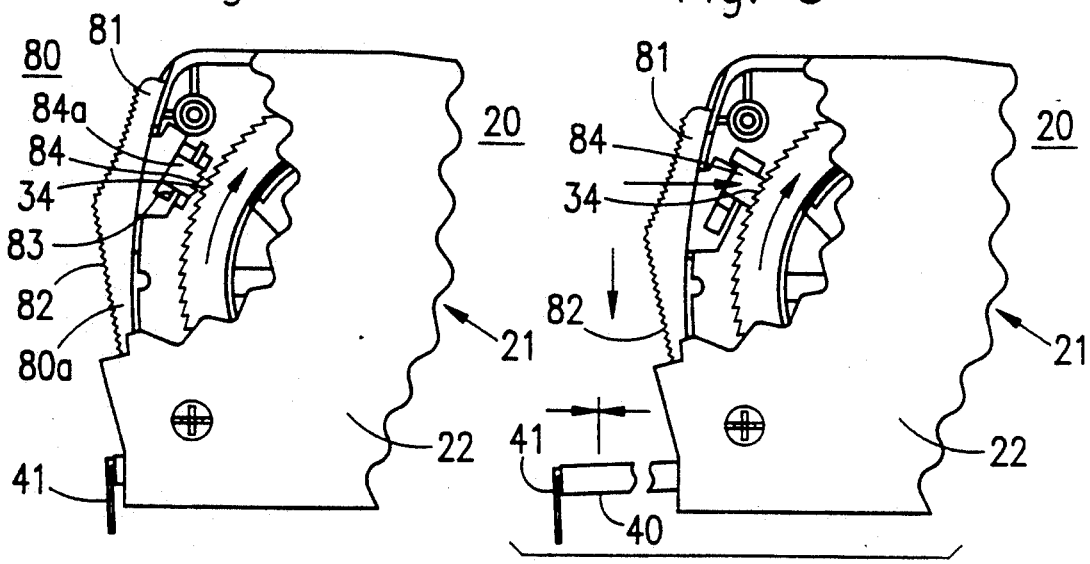
FIGS. 9 and 10 are side elevational views partly in section of still another embodiment of the present invention.

Referring now to FIGS. 9 and 10, there is disclosed another embodiment of the invention wherein the locking mechanism 80 is disposed in the front of the housing 21 but is of the same nature and design as the second locking mechanism 60 in that it slides into and out of engagement with the serrations or teeth 34, 35 on the reel or spool 30. The locking mechanism 80 having a body portion 80a with exterior serrations 81 and 82 has slot forming member 83 in which is trapped the part 84a having teeth 84 (one not shown). The part 84a does not move vertically during movement of the body portion 80a vertically but does move toward and away from the spool rim and the teeth 34, 35 thereon, as seen in FIGS. 9 and 10. When the part 84a having the teeth 84 thereon is moved into the locked position by movement of the locking mechanism body portion 80 downward, the teeth 84 are held in the locked position by the calming action of the body portion 80a, thereby trapping the teeth 84 in contact with the teeth 34 so that continued pulling on the tape 40 will not displace the locking mechanism 80 from its locked position. Simultaneous with the engagement of teeth 84 with teeth 34, 35, the first locking mechanism 50 is moved so that the surface 56 engages the tape 40.

Figure 11:
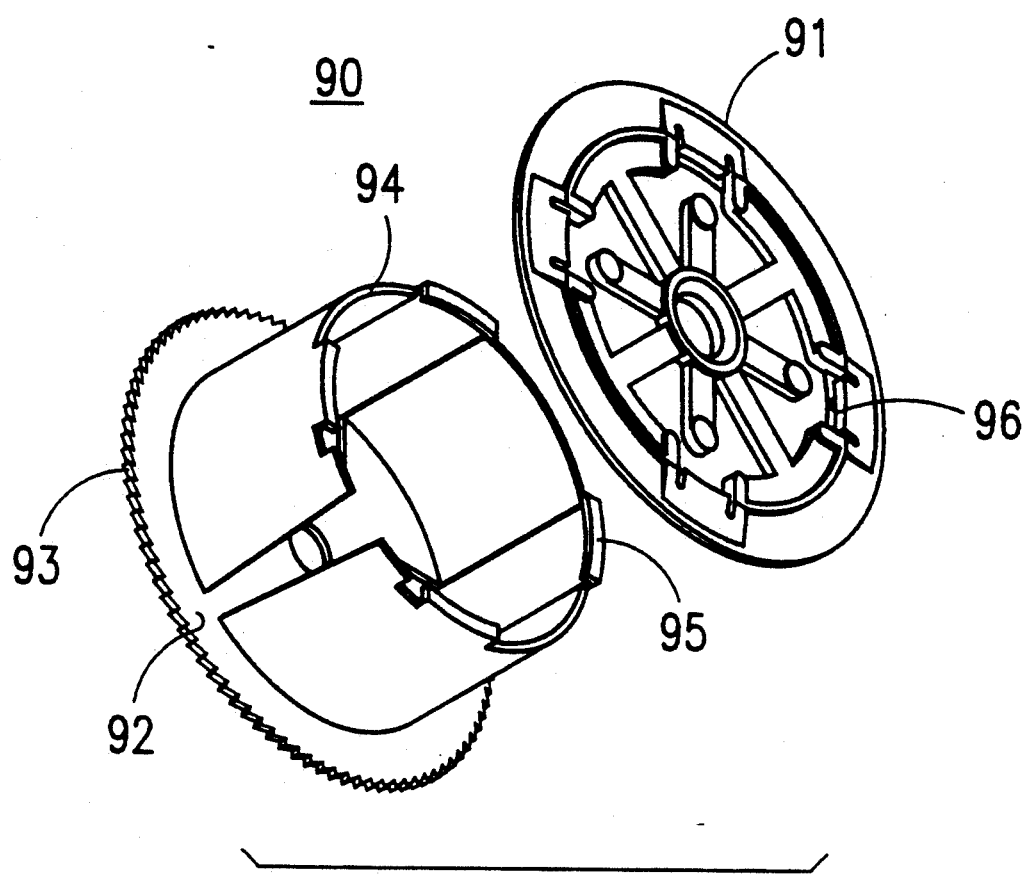
FIG. 11 is an exploded perspective view of an alternative to the spool or reel shown in FIG. 4.
Figure 12:
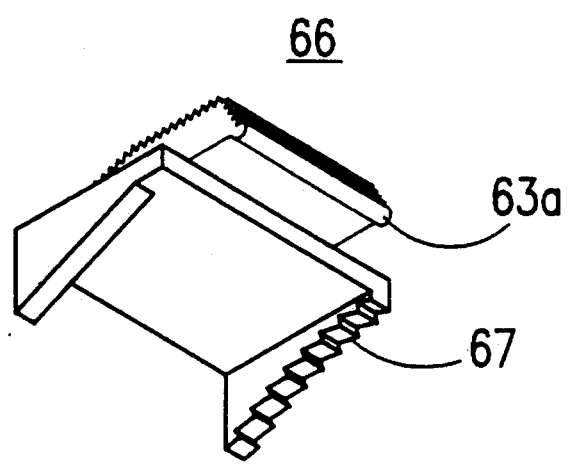
FIG. 12 is a perspective view of an alternative to the locking mechanism shown in FIG. 6.

FIGS. 11 and 12 show alternative embodiments, respectively of the spool 30 and second locking mechanism 60. FIG. 11 shows a spool 90 having a removable end portion 91 and a fixed end portion 92 having serrations 93 around the periphery thereof. A split cylindrical portion 94 connects the end portions 91 and 92. The cylindrical portion 94 has tabs 95 extending therefrom which fit into and frictional engage slots 96 in the end portion 91. The serrations are preferably on the fixed end portion 92. The second locking mechanism 66 shown in FIG. 12 is identical to mechanism 60, except that only one set of serrations 67 is provided to engage the serrations 93.

While there has been disclosed what is considered to be the preferred embodiment of the present invention, it is understood that various changes in the details may be made without departing from the spirit, or sacrificing any of the advantages of the present invention.

I claim:

1. A retractable tape measure having a housing for a flexible measuring tape and an opening in the housing through which a portion of the tape extends with the remainder of the tape being coiled around a spring biased reel having a hub around which the tape is coiled and opposed annular ends on said hub retaining said tape coiled therearound, at least one of said annular ends having a serrated circular peripheral edge about 90 to about 150 serrations, locking mechanism shiftably mounted on said housing movable into and out of engagement with said at least one serrated peripheral edge, said locking mechanism having a plurality of serrations thereon which when engaged with a plurality of serrations on said at least one serrated peripheral edge provides a positive lock for said tape coiled around said reel hub to prevent further withdrawal of the tape from said housing and means for maintaining said locking mechanism in engagement with said at least one serrated peripheral edge.

2. The retractable tape measure of claim 1, wherein said locking mechanism has serrations of the same size as the serrations on said at least one serrated peripheral edge.

3. The retractable tape measure of claim 2, wherein at least three serrations of said at least one serrated peripheral edge and said locking mechanism are in engagement when said locking mechanism is in locked engagement with said serrations on said at least one serrated peripheral edge.

4. The retractable tape measure of claim 3, wherein said locking mechanism serrations are on an arc having the radius of curvature as said at least one serrated peripheral edge.

5. The retractable tape measure of claim 4, and further comprising a tab frictionally engageable with the tape to provide resistance to winding and unwinding said tape without locking the tape.

6. The retractable tape measure of claim 1, wherein said locking mechanism is pivotally mounted on said housing.

7. The retractable tape measure of claim 4, wherein said locking mechanism is slidably mounted on said housing.

8. The retractable tape measure of claim 4, wherein said locking mechanism is mounted on the top of said housing.

9. The retractable tape measure of claim 5, wherein said locking mechanism and tab are mounted on the front of said housing above the opening in said housing through which the tape extends.

10. The retractable tape of claim 1, wherein both of said annular ends have serrated peripheral edges therearound.

11. The retractable tape of claim 1, wherein only one of said annular ends has said serrated peripheral edge.

12. The retractable tape of claim 1, wherein the serrations on said at least one serrated peripheral edge are angularly disposed in the range of from about 45° to about 90°.

13. The retractable tape of claim 12, wherein the serrations are disposed at about 70°.

14. A retractable tape measure having a housing for a flexible measuring tape and an opening in the housing through which a portion of the tape extends with the remainder of the tape being coiled around a spring biased reel having a hub around which the tape is coiled and opposed annular ends on said hub retaining said tape coiled therearound, at least one of said annular ends having a serrated circular peripheral edge with about 90 to about 150 serrations, each of said serrations being angularly disposed in the range of from about 45° to about 90°, a serrated locking mechanism shiftably mounted on said housing movable into and out of engagement with said at least one serrated circular peripheral edge, said serrated locking mechanism including a plate with spaced apart serrations thereon having the same radius of curvature as said serrations on said at least one serrated circular peripheral edge, and means for maintaining said locking mechanism in engagement with said at least one serrated circular peripheral edge when said locking mechanism is in engagement with said at least one serrated circular peripheral edge, whereby when said locking mechanism is engaged further uncoiling of the measuring tape is prevented as said reel is locked against rotation.

15. The retractable tape measure of claim 14 wherein only one of said annular ends has said serrated peripheral edge.

16. The retractable tape measure of claim 14, wherein the serrations on said at least one serrated peripheral edge are angularly disposed in the range of from about 45° to about 70°.

17. The retractable tape measure of claim 14, wherein the serrations on said at least one serrated peripheral edge are disposed at about 70°.

18. The retractable tape measure of claim 14, wherein said locking mechanism is mounted about the axis of rotation of said reel.

19. The retractable tape measure of claim 14, and further comprising an actuator exterior of said housing for said serrated locking mechanism, vertical movement of said actuator causing movement of said serrated locking mechanism toward and away from said at least one serrated peripheral edge.

20. The retractable tape measure of claim 19, wherein said serrations on said at least one serrated peripheral edge have an angle of about 70°.

* * * * *

UNITED STATES PATENT AND TRADEMARK OFFICE
CERTIFICATE OF CORRECTION

PATENT NO. : 5,245,761
DATED : September 21, 1993
INVENTOR(S) : Arthur Waldherr

It is certified that error appears in the above-indentified patent and that said Letters Patent is hereby corrected as shown below:

Column 5, line 12, after "edge" insert --with--.

Column 6, line 37 and 38, delete "said serrated peripheral edge" and insert --serrations therearound--.

Column 6, line 56, after "wherein" insert --each of--.

Signed and Sealed this

Twelfth Day of July, 1994

*Attest:*

BRUCE LEHMAN

*Attesting Officer*     *Commissioner of Patents and Trademarks*